United States Patent [19]
Cohn

[11] 3,894,912
[45] July 15, 1975

[54] DETERMINATION OF PARAMETERS OF A NUCLEAR REACTOR THROUGH NOISE MEASUREMENTS

[75] Inventor: Charles E. Cohn, Clarendon Hills, Ill.

[73] Assignee: The United States of America as represented by the United States Energy Research and Development Administration, Washington, D.C.

[22] Filed: Dec. 21, 1973

[21] Appl. No.: 427,394

Related U.S. Application Data

[63] Continuation-in-part of Ser. No. 265,060, June 21, 1972, abandoned.

[52] U.S. Cl. .......... 176/19 R; 235/181; 176/19 EC
[51] Int. Cl.² ........................................ G21C 17/00
[58] Field of Search ............ 176/19 R, 19 EC, 19 J; 275/181

[56] References Cited
OTHER PUBLICATIONS

Albrecht and Scifritz, pp. 417–430 of Nuclear Science & Eng., Vol. 41, 1970.
Scifritz, pp. 513–522 of Nuclear Applications & Technology, Vol. 7, Dec. 1969.

Primary Examiner—Harvey E. Behrend
Attorney, Agent, or Firm—John A. Horan; Arthur A. Churm; Walter L. Rees

[57] ABSTRACT

This invention relates to a method of measuring parameters of a nuclear reactor by noise measurements. Noise signals are developed by the detectors placed in the reactor core. The polarity coincidence between the noise signals is used to develop quantities from which various parameters of the reactor can be calculated.

1 Claim, 2 Drawing Figures

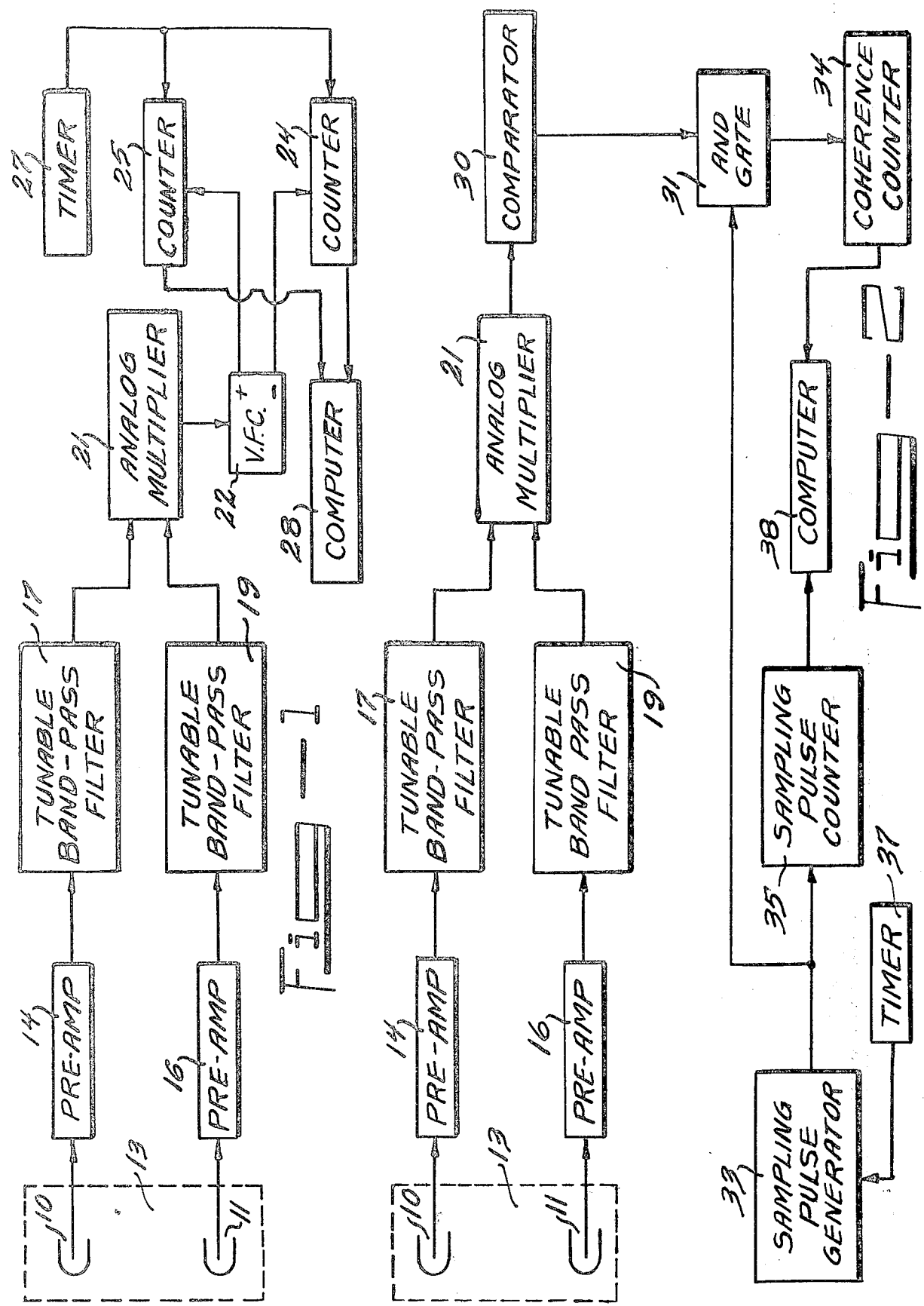

DETERMINATION OF PARAMETERS OF A NUCLEAR REACTOR THROUGH NOISE MEASUREMENTS

CONTRACTUAL ORIGIN OF THE INVENTION

The invention described herein was made in the course of, or under, a contract with the United States Atomic Energy Commission.

BACKGROUND OF THE INVENTION

This is a continuation-in-part of application Ser. No. 265,060 of Charles E. Cohn, filed June 21, 1972, now abandoned.

The determination of various parameters of a nuclear reactor, for example, the reactivity during the operation and loading of the reactor, is very important in order to provide safe and flexible reactor operation. The less certain the operator is of the reactivity, the more slowly fuel loading or changes in the power level (especially approach to criticality) can be made so that the reactor does not reach a dangerous condition. Various methods depending upon intentionally applied system disturbances, such as control rod drop tests, have been developed to measure these parameters. Use of these disturbances is often undesirable in that their use may be expensive and time-consuming and they may disrupt reactor operation. Even with these tests and the use of computers to carry out computations, the reactivity determination is uncertain. Delays in fuel handling and approach to criticality affect the operating economy of the reactor. Complicating factors in determining reactivity are due to uncertainties in fuel depletion, neutron source strength, burnup and poisoning of the control rods.

In recent years noise analysis including auto- and cross-power spectral density measurements have been used to obtain kinetic information concerning the reactor prompt neutron decay constant, reactivity and absolute power level. In the frequency domain the correlation time behavior within the neutron population due to the branching processes in the neutron chains is represented in frequency-dependent power spectral densities with characteristic parameters that are related to kinetic reactor constants. Methods have been developed which use correlation techniques to determine reactivity and other kinetic parameters of a reactor. These techniques, however, are not equally applicable to every type of reactor. For example, many of these techniques require that the instrumentation be calibrated with the reactor critical. In a plutonium reactor, the reactor is never really critical so that measurements using prior art techniques will not provide adequate reliability and accuracy.

It is therefore an object of this invention to provide an improved method of measuring parameters of a nuclear reactor using fluctuations in neutron densities within the reactor.

Another object of this invention is to provide a method of measuring the cross-spectrum between any two noise signals.

Another object of this invention is to provide a method of determining the precision of the cross-spectrum measurement.

SUMMARY OF THE INVENTION

This invention relates to a method of measuring various parameters of a nuclear reactor using noise correlation techniques. In the practice of this invention, two or more neutron detectors located in or near the reactor core develop fluctuating signals as a result of neutron bombardment. These signals are band limited by narrow band filters. The resulting two signals are multiplied in an analog multiplier which develops an output signal having a magnitude dependent upon the amplitudes of the two input signals and a polarity which is dependent upon the polarities of the two input signals. For example, the output signal may be positive if the two input signals are both positive or both negative. If noe input signal is negative and the other positive, the output signal is negative. The positive polarity signal is integrated in a first integrator and the negative polarity signal is integrated in a second integrator. The quantities which are developed by the first and second integrators can then be used to calculate the coherence and the cross power spectral density of the nuclear reactor. The reactivity of the reactor can be calculated using the coherence. The output signal from the analog multiplier can also be used to evaluate the precision of the cross power spectral density measurements.

BRIEF DESCRIPTION OF THE DRAWINGS

The invention is illustrated in the drawings, of which:

FIG. 1 is a block diagram of the system used for carrying out the measurements of this invention; and FIG. 2 is a block diagram of a second embodiment of the invention.

DETAILED DESCRIPTION OF THE INVENTION

In FIG. 1, there is shown a block diagram of the system used to carry out the method of this invention. Neutron detectors 10 and 11 are positioned in the core 13 of a nuclear reactor. The outputs from detectors 10 and 11 are fluctuating signals which are amplified in preamplifiers 14 and 16, respectively. The outputs of preamplifiers 14 and 16 are filtered in tunable band-pass filters 17 and 19.

The noise measurements of this invention are made over a frequency range of interest which is determined by the particular system on which the measurements are to be made. The center frequencies of band-pass filters 17 and 19 are chosen to be within this range of interest. The bandwidths of band-pass filters 17 and 19 are determined by the precision and resolution requirements of the system to be measured. A wider bandwidth gives greater precision while a narrower bandwidth gives greater resolution. Thus the widest bandwidth required is determined by the variance of the cross power spectral density and must be narrow enough so that the frenquency variations are not smeared. The narrowest bandwidth is that required to give adequate precision. Both band-pass filters 17 and 19 have the same bandwidth and center frequency.

When the noise measurements are made in a reactor, the frequencies passed by the filter should be above the delayed neutron roll-off frequencies and below the prompt neutron roll-off frequency. These frequencies can be calculated by those skilled in the art from known reactor parameters. In an example of a fast reactor, filters having a bandwidth of one-third octave and center frequencies between 50 and 150 cycles per second were used. For a thermal reactor the center frequencies would be substantially lower, down to 2 cycles per second. Using the criteria outlined above, those skilled in the art are readily able to select the proper center frequency and bandwidth for bank-pass filters 17 and 19.

The outputs of the bandpass filters 17 and 19 are coupled to an analog multiplier 21 where the two signals are multiplied together. An analog multiplier is well known in the art and may be described as a device having two input circuits to which input signals are applied and an output circuit at which a product signal is developed. The resulting product signal has a magnitude which is a function of the product of the magnitudes of the two input signals. The polarity (algebraic sign) of the product signal is a function of the relative polarities (algebraic signs) of the two input signals. If the two input signals applied to analog multiplier 21 have the same polarity, the product signal from amplifier 21 will be of one polarity, for example positive. If the two signals applied to analog multiplier 21 have different polarities, the product signal from analog multiplier 21 will be of a different polarity, for example negative.

The product signal from analog multiplier 21 is coupled to a voltage-to-frequency converter (VFC) 22. VFC 22 has two pulse outputs. One is operative when the VFC input is positive and the other is operative when the VFC input is negative. The frequency of the pulse output from either of the two outputs is dependent upon the magnitude of the input signal. The outputs are counted by two separate counters 24 and 25 which are started and stopped simultaneously by a signal from timer 27. Thus one counter integrates the analog multiplier output whenever the analog multiplier inputs are the same sign, while the second counter integrates the multiplier output whenever the multiplier inputs are of opposite sign. The magnitude of the integrated multiplier output developed in counters 24 and 25 is dependent on the amplitude of the noise signals as well as their polarity. This differs from prior art systems wherein only polarity is taken into account. By means of this method of integration, all the information in the noise signal is used to determine the desired parameters, not just the zero crossings as in prior art systems.

The duration of the signal from timer 27 determines the integration time of the counters 24 and 25. This time duration is determined by factors known to those skilled in the art. The integration time must be long enough so that the effect of the random noise signals in the system is suppressed so that a desired level of precision is obtained. The upper time limit is determined by the practical consideration of how long one can afford to carry out the integration. For example, in a power reactor, it is desirable to make the measurements in as short a time as possible so that the various parameters can be determined quickly. In this case the integration time would be of the order of 10 minutes or less. In an experimental reactor longer integration times might be useful. The smallest time interval is determined by the detector efficiency and is of the order of 30 seconds. In other noise systems these integration times could vary greatly depending upon the characteristics of the system.

Using this system it is possible to determine two parameters of the noise system from which other important parameters can be calculated. The first parameter is designated as A and is the time integral of that portion of the multiplied signals which have the same polarity. The second parameter is designated as B.

Using the parameters A and B thus obtained, it is possible to determine various parameters of a system as, for example, a reactor. The cross power spectral density (CPSD) is the difference between the two scaler counter readings.

$$CPSD = A - B \quad (1)$$

The coherence is indicated by the ratio of the signals A and B. The ratio R is given by $$R = \frac{A}{B} = \frac{\int_0^\infty \int_0^\infty xyP(x,y)dxdy + \int_{-\infty}^0 \int_{-\infty}^0 xyP(x,y)dxdy}{\int_0^\infty \int_{-\infty}^0 xyP(x,y)dxdy + \int_{-\infty}^0 \int_0^\infty xyP(x,y)dxdy} \quad 2$$

where $P(x,y)$ is the bivariate Gaussian probability density $$P(x,y) = \frac{1}{2\sqrt{1-\gamma^2}} \exp\left[\frac{1}{2(1-\gamma^2)}(x^2 - 2\gamma xy + y^2)\right] \quad 3$$

Here $\gamma$ is the coherence or correlation, and ranges from zero with no correlation to unity with complete correlation. We obtain $$R = \frac{A}{B} = \frac{\frac{2}{\pi}(\gamma \sin^{-1}\gamma + \sqrt{1-\gamma^2} + \gamma)}{\frac{2}{\pi}(\gamma \sin^{-1}\gamma + \sqrt{1-\gamma^2} - \gamma)}$$

The value of $\gamma$ corresponding to a measured R is determined from formula (4).

With the coherence determined, an unknown subcriticality in dollars for band-pass frequencies $\lambda < \omega < \beta/l$ is given by:

$$\$ = (1 + \$_1) \sqrt{\left(\frac{\gamma_1}{1-\gamma_1}\right)\left(\frac{1-\gamma_2}{\gamma_2}\right)} - 1 \quad 5.$$

where $\gamma_2$ is the coherence determined from measurements of $A_2$ and $B_2$ with the reactor in the unknown subcritical state, $\gamma_1$ is the coherence determined from measurements $A_1$ and $B_1$ with the reactor at a known reference criticality and $\$_1$. $\lambda$ is the delayed neutron decay constant, $\omega$ the frequency and $\beta/l$ the prompt neutron chain decay constant for the critical reactor. The use of this method is particularly applicable to plutonium reactors, since the previous methods have been restricted to using a critical reference. Since the plutonium reactor is never really critical, it is difficult to achieve accuracy using methods which require a critical reference.

In carrying out this method, $\$_1$ can be determined by a rod drop test such as is described in *Rod Drop Measurements of Subcriticality*, S. G. Carpenter and R. W. Goin, Argonne National Laboratory, Applied Physics Division Annual Report, July 1, 1969 to June 30, 1970; January 1971, ANL-7710, page 206. The $\$_1$ reference measurement is made near criticality, for example, when the excess multiplication factor $\Delta k$ is $-10^{-5}$ or $-10^{-6}$. It is not necessary that the reference measurement $\$_1$ be made at any particular subcriticality; however, the closer to critical the reactor is when the measurement is made the more accurate will be the measurement of subcriticality $\$_1$. $\gamma_1$ is measured using the method of this invention and equation (4). $\gamma$, as found by using the method of equation (8), to be subsequently described, can also be used to determine subcriticality $\$$.

A computer 28 can be coupled directly to counters 24 and 25 to perform the calculations required. Also, if desired, the parameters A and B can be applied to a separate computer to perform the calculations.

In FIG. 2 there is shown a circuit for measuring the prevision of CPSD measurements. Components of FIG. 2 which are the same as those of FIG. 1 have the same reference numerals. The product signal from analog multiplier 21 is coupled to comparator circuit 30. Comparator circuit 30 is responsive to the polarity of the product signal to develop a control signal when the noise signals are of the same polarity. The control signal is applied to AND gate 31 to enable the gate when the product signal is positive. When the product signal is zero or negative, AND gate 31 is closed.

Sampling pulse generator 33 develops sampling pulses at a predetermined rate and they are coupled to sampling pulse counter 35 where they are counted, with the number of pulses counted in sampling pulse counter 35 being equal to $N_s$. The length of time that the pulses are developed by sampling pulse generator 33 is determined by timer 37. The sampling pulses are also coupled to coherence counter 34 through AND gate 31. Coherence counter 34 thus counts the number of pulses ($N_c$) developed when the two noise signals are of the same polarity.

The error $\delta$ in a CPSD measurement $C$ may be written as:

$$\delta(C) \leq \sqrt{\frac{G_1 G_2}{WT}} \qquad \text{G.}$$

where $W$ is the bandwidth of filters 17 and 19 and $T$ is the measuring time as determined by timer 27. $G_1$ and $G_2$ are the mean square amplitudes in each channel.

In these terms the relative error is given by $$\frac{\delta(C)}{C} \leq \sqrt{\frac{1}{\gamma WT}} \qquad 7.$$

$\gamma$ can be derived from the polarity coherence $Q$ according to:

$$\gamma = \sin \frac{\pi}{2} Q \qquad 8.$$

where $$Q = \frac{N_c - N_s/2}{N_s/2} \qquad 9.$$

Since $N_s$ represents the total time $T$ over which the measurement takes place and $N_c$ the time $T_1$ when the two noise signals are of the same polarity, equation (10) can be written:

$$Q = \frac{T_1 - T/2}{T/2} \qquad 10.$$

A computer 38 can be coupled directly to sampling pulse counter 35 and coherence counter 34 to perform the calculations required. Also, if desired, the quantities $T_1$ and $T$ can be applied to a separate computer to perform the calculations.

The embodiments of the invention in which an exclusive property or privilege is claimed are defined as follows:

1. The method of making reactor measurements to determine reactor parameters $A_1$, $B_1$, $A_2$, $B_2$ and $\$_1$ from which an unknown subcriticality of a nuclear reactor can be calculated including the steps of:
   a. measuring the neutron density fluctuation at two different points in the nuclear reactor to develop first and second noise signals;
   b. filtering each of said first and second noise signals in first and second band-pass filters respectively, the band of frequencies passed by each of said band-pass filters being the same and being above the delayed neutron roll-off frequencies and below the prompt neutron roll-off frequency;
   c. multiplying said filtered first and second noise signals in an analog multiplier to develop a first product signal with said first and second noise signals having the same polarity and a second product signal with said first and second noise signals having opposite polarities;
   d. establishing the reactor at a subcriticality greater than 1$ subcritical and less than critical and measuring a reference subcriticality $\$_1$ by a rod drop test;
   e. with the reactor at said reference subcriticality integrating said first product signal over a predetermined time period $T_1$ to develop the reactor parameter $A_1$, where 30 seconds $< T_1 <$ 10 minutes;
   f. with the reactor at said reference subcriticality integrating said second product signal over said time period $T_1$ to develop the reactor parameter $B_1$;
   g. with the reactor at the unknown subcriticality integrating said first product signal over a time period $T_2$ to develop an integrated product signal $A_2$, where 30 seconds $< T_2 <$ 10 minutes; and
   h. with the reactor at the unknown subcriticality integrating said second product signal over said time period $T_2$ to develop an integrated product signal $B_2$.

* * * * *